US012000500B2

(12) United States Patent
Zähe

(10) Patent No.: US 12,000,500 B2
(45) Date of Patent: Jun. 4, 2024

(54) PILOT-OPERATED VALVE WITH A POSITION INDICATOR

(71) Applicant: Sun Hydraulics, LLC, Sarasota, FL (US)

(72) Inventor: Bernd Zähe, Sarasota, FL (US)

(73) Assignee: Sun Hydraulics, LLC, Sarastoa, FL (US)

( * ) Notice: Subject to any disclaimer, the term of this patent is extended or adjusted under 35 U.S.C. 154(b) by 81 days.

(21) Appl. No.: 17/878,115

(22) Filed: Aug. 1, 2022

(65) Prior Publication Data

US 2024/0035586 A1 Feb. 1, 2024

(51) Int. Cl.

| | |
|---|---|
| *F16K 31/122* | (2006.01) |
| *F15B 11/08* | (2006.01) |
| *F15B 13/02* | (2006.01) |
| *F15B 13/04* | (2006.01) |
| *F16K 11/044* | (2006.01) |
| *F16K 27/02* | (2006.01) |
| *F16K 37/00* | (2006.01) |
| *F15B 13/00* | (2006.01) |

(52) U.S. Cl.
CPC ........ *F16K 31/1221* (2013.01); *F15B 13/027* (2013.01); *F15B 13/0405* (2013.01); *F16K 11/044* (2013.01); *F16K 27/0263* (2013.01); *F16K 37/0041* (2013.01); *F15B 11/08* (2013.01); *F15B 2013/004* (2013.01); *F15B 2013/0409* (2013.01)

(58) Field of Classification Search
CPC .. F15B 11/003; F15B 13/027; F15B 13/0405; F15B 2013/0409; F16K 31/1221
See application file for complete search history.

(56) References Cited

U.S. PATENT DOCUMENTS

| | | | |
|---|---|---|---|
| 9,719,530 B2 * | 8/2017 | Specks | F15B 11/003 |
| 10,774,849 B1 * | 9/2020 | Zähe | F16K 15/18 |
| 10,969,800 B2 * | 4/2021 | Zähe | F15B 13/029 |
| 11,009,896 B2 * | 5/2021 | Zähe | F15B 13/015 |
| 2021/0254641 A1 | 8/2021 | Schmidt et al. | |

* cited by examiner

*Primary Examiner* — Michael Leslie
(74) *Attorney, Agent, or Firm* — McDonnell Boehnen Hulbert & Berghoff LLP

(57) ABSTRACT

An example valve includes: a first port; a second port; a third port; a poppet configured to be subjected to (i) a first fluid force by fluid of the first port acting on the poppet in a proximal direction toward a poppet seat, and (ii) a second fluid force by fluid of the second port acting on the poppet in a distal direction; a pilot piston configured to be subjected to a pilot fluid force by a pilot fluid signal received at the third port; a check spring applying a spring force on the poppet in the proximal direction; and pilot spring applying a pilot spring force on the pilot piston in the proximal direction.

17 Claims, 4 Drawing Sheets

PILOT-OPERATED VALVE WITH A POSITION INDICATOR

BACKGROUND

A pilot-operated check valve can be configured as a pilot-to-open check valve. Particularly, a pilot-operated check valve can have three ports and is configured to control fluid flow between a first port and a second port based on a fluid signal received at a third port that can be referred to as a pilot port. For example, the pilot-operated check valve is configured to allow free fluid flow from the second port to the first port, while blocking fluid flow in the opposite direction (i.e., from the first port to the second port). When a pilot fluid signal is received at the third port, the pilot-operated check valve can open to allow fluid flow from the first port to the second port. As such, pilot-operated check valves can lock loads in a leak-free mode, and they are suited for clamping applications or applications involving preventing a negative load from falling down in case of hose failure.

It may be desirable to have a pilot-operated check valve open to provide fluid flow from the second port to the first port at a small pressure differential between the second port and the first port. Otherwise, if the pressure level at the first port is high and a large pressure differential is required, a large pressure drop occurs across the valve, rendering the valve inefficient. Further, under some operating conditions, the required pressure level at the second port might be too high and the valve might remain closed.

In some applications, it may be desirable to have an indication that the valve is closed and that the actuator controlled by the valve will not move for safety purpose. As such, it may be desirable to include a position indictor that provides information confirming that the valve is closed. Such position indicator can also provide information indicating the mode of operation in which the valve is operating. It is with respect to these and other considerations that the disclosure made herein is presented.

SUMMARY

The present disclosure describes implementations that relate to a pilot-operated valve with a position indicator.

In a first example implementation, the present disclosure describes a valve. The valve includes: a plurality of ports comprising: a first port, a second port, and a third port configured to receive a pilot fluid signal; a poppet configured to be subjected to (i) a first fluid force by fluid of the first port acting on a first surface area of the poppet in a proximal direction toward a poppet seat, wherein the poppet blocks fluid flow to and from the first port when seated at the poppet seat, and (ii) a second fluid force by fluid of the second port acting on a second surface area of the poppet, equal to the first surface area, in a distal direction; a pilot piston configured to be subjected to a pilot fluid force by the pilot fluid signal acting in the distal direction; a check spring applying a spring force on the poppet in the proximal direction; and a pilot spring applying a pilot spring force on the pilot piston in the proximal direction, wherein the valve is configured to operate in: (i) a first mode of operation, wherein a pressure differential between the second port and the first port overcomes the spring force of the check spring, causing the poppet to be unseated and allow fluid flow from the second port to the first port, and (ii) a second mode of operation, wherein the pilot fluid force overcomes the pilot spring force, causing the pilot piston to move in the distal direction, thereby causing the poppet to move therewith off the poppet seat, allowing fluid flow from the first port to the second port.

In a second example implementation, the present disclosure describes a system. The system includes: a source of fluid; a fluid reservoir; an actuator having a first chamber and a second chamber therein; a directional control valve having (i) an inlet port fluidly-coupled to the source of fluid, (ii) a return port fluidly coupled to the fluid reservoir, and (iii) a workport, wherein the directional control valve is configured to fluidly-couple the inlet port to the workport or fluidly couple the workport to the return port; and the valve of the first example implementation, wherein the first port is fluidly-coupled to the first chamber of the actuator, the second port is fluidly-coupled to the workport of the directional control valve, and the third port is configured to receive the pilot fluid signal from fluid provided to the second chamber of the actuator.

In a first example implementation, the present disclosure describes a valve. The valve includes: a plurality of ports comprising: a first port, a second port, and a third port configured to receive a pilot fluid signal; a poppet configured to be subjected to (i) a first fluid force by fluid of the first port acting on the poppet in a proximal direction toward a poppet seat, wherein the poppet blocks fluid flow to and from the first port when seated at the poppet seat, and (ii) a second fluid force by fluid of the second port acting on the poppet in a distal direction; a pilot piston configured to be subjected to a pilot fluid force by the pilot fluid signal acting in the distal direction; a check spring applying a spring force on the poppet in the proximal direction; a pilot spring applying a pilot spring force on the pilot piston in the proximal direction, wherein the valve is configured to operate in: (i) a first mode of operation, wherein a pressure differential between the second port and the first port overcomes the spring force of the check spring, causing the poppet to be unseated and allow fluid flow from the second port to the first port, and (ii) a second mode of operation, wherein the pilot fluid force overcomes the pilot spring force, causing the pilot piston to move in the distal direction, thereby causing the poppet to move therewith off the poppet seat, allowing fluid flow from the first port to the second port; and a position sensor comprising: (i) a poppet activator pin configured as a magnetic target coupled to the poppet, (ii) a piston activator pin configured as a respective magnetic target coupled to the pilot piston, and (iii) a magnetic sensor configured to detect position of the poppet activator pin and the piston activator pin.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

DETAILED DESCRIPTION

In examples, a pilot-operated check valve can be fluidly-coupled to a first chamber of a hydraulic actuator. It is desirable for such a valve to allow fluid flow from a source of fluid (e.g., a pump) to the first chamber of the hydraulic actuator, while blocking fluid flow from the first chamber to a fluid reservoir to hold a load (i.e., prevent the actuator from moving).

An example pilot-operated check valve can have three ports: a first port fluidly-coupled to a first side of the actuator (e.g., rod side of a hydraulic actuator cylinder), a second port that can be fluidly-coupled via a directional control valve to a source of fluid or to a fluid reservoir, and a third port that can be referred to as a pilot port. The pilot port can be fluidly-coupled via a pilot line to a supply line connected to a second chamber of the actuator (e.g., head side of the hydraulic actuator cylinder).

The disclosed pilot-operated check valve is configured to allow free fluid flow (e.g., fluid flow at a minimal differential pressure) from the second port to the first port while blocking fluid flow in the opposite direction from the first port to the second port. When a pilot fluid signal provided via the pilot line to the third port has a particular pressure level, the pilot-operated check valve opens and allows fluid flow from the first port to the second port. When the pilot fluid signal is removed, the valve returns to a closed position, blocking fluid flow from the first port to the second port, thereby holding the load handled the hydraulic actuator in position.

The disclosed valve further includes a position sensor indicating position of one or more movable elements (e.g., poppet, spool, or piston) within the valve. The position sensor can be a proportional sensor or an on/off type switch. The position sensor provides information to a controller to confirm that the valve is closed. This way, the controller can determine that the load at the actuator is held in position and the actuator will not move, for safety purposes. The controller can also determine or confirm the mode of operation of the valve using the information from the position indicator.

Further, a proportional position signal may also provide an indication of fluid flow rate through the valve. This way, the controller can control the speed of the hydraulic actuator without having to install a position sensor at the actuator, which may be more costly.

Figure 1:
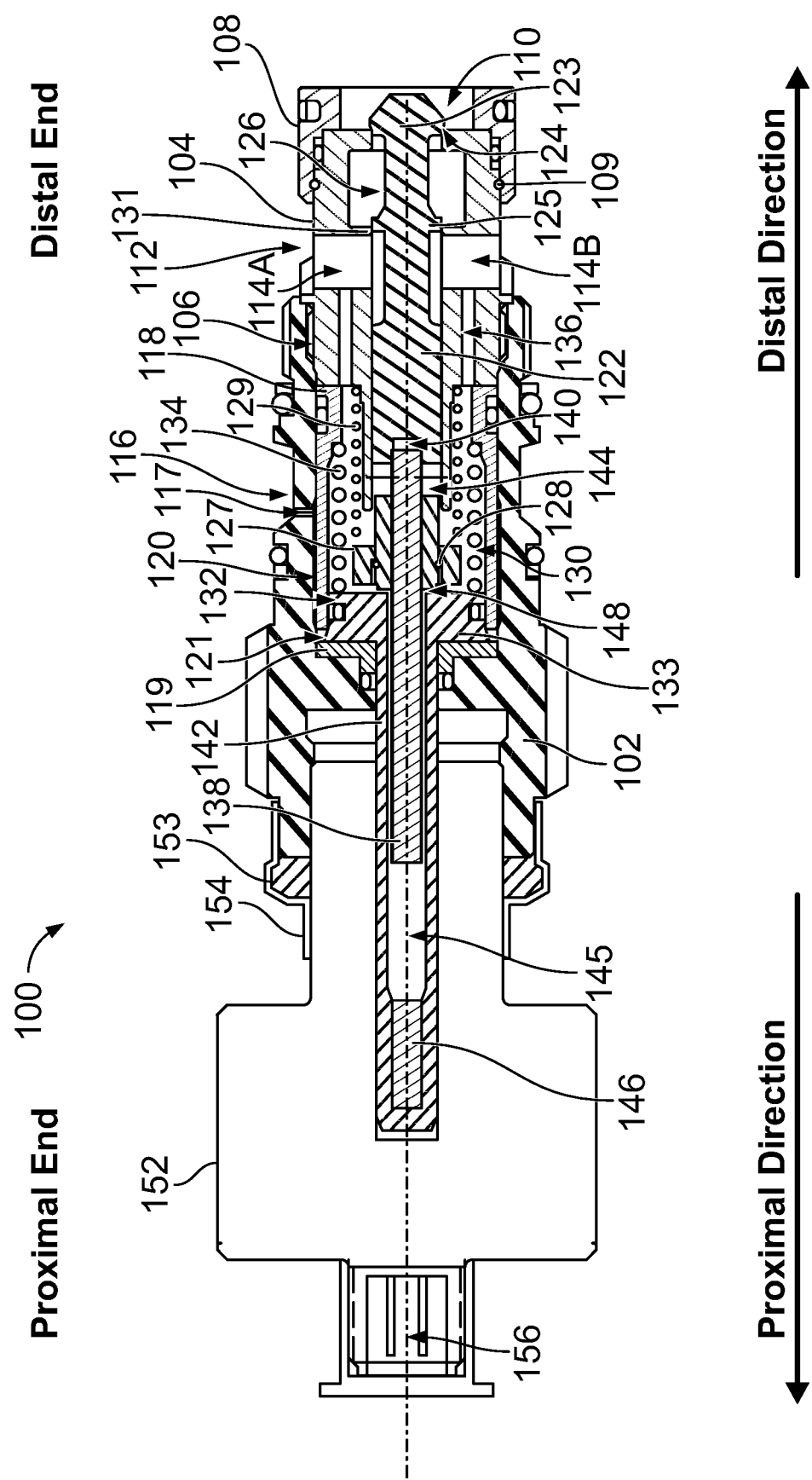
FIG. 1 illustrates a cross-sectional side view of a valve, in accordance with an example implementation.

FIG. 1 illustrates a cross-sectional side view of a valve 100, in accordance with an example implementation. The valve 100 may be inserted or screwed into a manifold having ports corresponding to ports of the valve 100 described below, and such manifold can thus fluidly couple the valve 100 to other components of a hydraulic system.

The valve 100 includes a housing 102 having a longitudinal cylindrical cavity therein. The valve 100 also includes a main sleeve 104 disposed, at least partially, within the longitudinal cylindrical cavity of the housing 102 and received at a distal end of the housing 102. The main sleeve 104 is rigidly- or fixedly-coupled to the housing 102. For example, the main sleeve 104 can be threaded to the housing 102 via threads 106.

The valve 100 also includes a nose piece 108 received at a distal end of the main sleeve 104. The nose piece 108 is coupled to the main sleeve 104 via a retaining ring 109 such that the nose piece 108 is allowed to "float" relative to the main sleeve 104. This way, the nose piece 108 can move to compensate for any inaccuracies in a cavity of a manifold in which the valve 100 is disposed.

The valve 100 includes a first port 110 at a nose or distal end of the nose piece 108. The first port 110 can also be referred to as a load port and is configured to be fluidly-coupled to a chamber of a hydraulic actuator.

The valve 100 also includes a second port 112 disposed laterally in the main sleeve 104. The second port 112 can be fluidly-coupled, via a directional control valve, to either a fluid reservoir or a source of fluid (e.g., a pump). The second port 112 can include a set of cross-holes, such as cross-holes 114A, 114B disposed in circular or circumferential array about the main sleeve 104. The term "hole" is used generally herein to indicate a hollow place (e.g., cavity) in a solid body or surface, for example. The term "cross-hole" indicates a hole that crosses a path of another hole, cavity, or channel.

The valve 100 also includes a third port 116. The third port 116 can be referred to as a pilot port. The third port 116 can include one or more cross-holes that can be referred to as pilot signal cross-holes, such as a pilot signal cross-hole 117 disposed in the housing 102. The pilot signal cross-hole 117 is configured to receive an input pilot fluid signal to actuate the valve 100 and allow fluid flow from the first port 110 to the second port 112.

The valve 100 also includes a pilot sleeve 118 disposed adjacent to the main sleeve 104 within the housing 102. The housing 102 includes an undercut or annular groove 120 that fluidly couples the pilot signal cross-hole 117 to a cavity or space 121 between the pilot sleeve 118 and a seal retainer 119.

The main sleeve 104 includes a respective longitudinal cylindrical cavity therein. The valve 100 includes a poppet 122 that is disposed, at least partially, and slidably-accommodated, in the longitudinal cylindrical cavity of the main sleeve 104. Further, the term "slidably-accommodated" is used throughout herein to indicate that a first component (e.g., the poppet 122) is positioned relative to a second component (e.g., the main sleeve 104) with sufficient clearance therebetween, enabling movement of the first component relative to the second component in the proximal and distal directions.

When the valve 100 is closed, a poppet head 123 of the poppet 122 is seated at a poppet seat 124 formed by an interior surface (e.g., an interior corner) of the main sleeve 104. The valve 100 is shown in FIG. 1 with the poppet 122 being seated at the poppet seat 124, thereby blocking a fluid path to and from the first port 110.

Further, the poppet 122 includes a flanged portion 125 that overlaps with an interior portion 131 of the main sleeve 104 to block fluid flow between the first port 110 and the cross-holes 114A, 114B through a chamber 126. The term "block" is used throughout herein to indicate substantially preventing fluid flow except for minimal or leakage flow of drops per minute, for example. As such, in this position, the fluid provided to the first port 110 from an actuator is not allowed to flow through the valve 100, and thus the load coupled to the actuator is held in-position and is precluded from moving.

The valve 100 further includes a spring retainer 127 disposed about an exterior peripheral surface of the poppet 122. The spring retainer 127 is configured to interact with the poppet 122 via a wire ring 128 disposed in an annular groove formed in the exterior peripheral surface of the poppet 122. The wire ring 128 engages with an interior surface of the spring retainer 127. With this configuration, a force that is applied to the spring retainer 127 in the proximal direction is transferred to the poppet 122 via the wire ring 128, and a force that is applied to the poppet 122 in the distal direction is transferred to the spring retainer 127 via the wire ring 128.

The valve 100 includes a check spring 129 disposed in a spring chamber 130 formed between or bounded by the pilot sleeve 118, the main sleeve 104, the poppet 122, and a pilot piston 132. In particular, the check spring 129 has a distal end resting against the main sleeve 104, whereas a proximal end of the check spring 129 rests against the spring retainer 127. The main sleeve 104 is fixedly-disposed within the housing 102 via the threads 106, and thus the check spring 129 applies a biasing force on the poppet 122 in the proximal direction via the spring retainer 127 and the wire ring 128.

The biasing force of the check spring 129 biases the poppet 122 toward the poppet seat 124. The check spring 129 is configured as a soft spring. As an example for illustration, the check spring 129 can be a 5 pounds per square inch (psi) spring.

Further, fluid at the first port 110 also acts on the poppet 122 in the proximal direction to help seat the poppet 122 at the poppet seat 124. Particularly, fluid at the first port 110 applies a first fluid force in the proximal direction (e.g., to the left in FIG. 1) on a first surface area of the poppet 122 that is equal to the circular area of the poppet seat 124. Assuming that the diameter of the poppet seat 124 of is $D_S$, the area of the poppet seat 124 is $$A_S = \pi \frac{D_S^2}{4}.$$

Assuming that pressure level at the first port 110 is $P_1$, then the first fluid force $F_1$ acting on the poppet 122 in the proximal direction is $$F_1 = P_1 . A_s = P_1 . \pi \frac{D_S^2}{4}.$$

The valve 100 further includes one or more pilot springs such as pilot spring 134 disposed in the spring chamber 130. The pilot spring 134 has a distal end resting against an internal shoulder formed in the pilot sleeve 118, whereas a proximal end of the pilot spring 134 rests against the pilot piston 132. With this configuration, the pilot spring 134 is configured to apply a biasing force on the pilot piston 132 in the proximal direction.

The pilot spring 134 is configured to be stiffer than the check spring 129. As an example for illustration, the pilot spring 134 can be an 18 psi spring.

A pilot fluid signal received at the third port 116 is communicated through the pilot signal cross-hole 117 and the annular groove 120 to the space 121 and to an unsealed space between the pilot piston 132 and the seal retainer 119. Thus, the pilot fluid signal applies a fluid force on an annular or flanged portion 133 of the pilot piston 132 in the distal direction against the pilot spring 134.

The main sleeve 104 has longitudinal channels, such as longitudinal channel 136, which fluidly couple the cross-holes 114A, 114B of the second port 112 to the spring chamber 130. This way, fluid at the second port 112 is communicated to the spring chamber 130 and applies a fluid force on the pilot piston 132 in the proximal direction. As such, a net fluid force equal to the difference between the fluid force of the pilot fluid signal and the fluid force of fluid from the second port 112 acts on the pilot piston 132.

As depicted in FIG. 1, a proximal portion of the poppet 122 is hollow to form a channel 140 in which a poppet activator pin 138 is received. As described in more detail below, the poppet activator pin 138 is configured as a magnetic target that allows a magnetic sensor to determine a position of the poppet activator pin 138 and the poppet 122.

In one example, to couple the poppet activator pin 138 to the poppet 122, the poppet activator pin 138 can be press-fitted within the poppet 122. Particularly, an inner diameter of the poppet 122 at a particular portion thereof can be slightly smaller than an outer diameter of the poppet activator pin 138 to allow the poppet activator pin 138 to be press-fitted within the poppet 122 when pressed through the channel 140.

In an example, the poppet 122 has lateral holes, such as hole 144. A tool can be inserted through the hole 144 to deform or swage the poppet activator pin 138 and ensure that the poppet activator pin 138 is coupled to the poppet 122 such that as the poppet 122 moves axially, the poppet activator pin 138 moves therewith.

As depicted in FIG. 1, the pilot piston 132 has the flanged portion 133 and a non-magnetic tube portion 142 disposed partially about the poppet activator pin 138. Particularly, the non-magnetic tube portion 142 defines a chamber 145 in which the poppet activator pin 138 is partially-disposed.

The valve 100 further includes a piston activator pin 146 disposed within and coupled to (e.g., press-fitted into) the non-magnetic tube portion 142 of the pilot piston 132. As described in more detail below, the piston activator pin 146 is configured as a magnetic target that allows a magnetic sensor to determine a position of the piston activator pin 146 and the pilot piston 132.

Fluid from the second port 112 is communicated through the cross-holes 114A, 114B, the longitudinal channel(s) 136 to the spring chamber 130. Fluid in the spring chamber 130 can then flow through gap 148 between a proximal end of the poppet 122 and a distal end of the pilot piston 132 and through annular space between the poppet activator pin 138 and non-magnetic tube portion 142 to the chamber 145 within the non-magnetic tube portion 142. Fluid in the chamber 145 applies a force on the poppet activator pin 138 (and thus on the poppet 122) in the distal direction. Further, fluid from the second port 112 is also communicated around the flanged portion 125 of the poppet 122 to the chamber 126 to apply a force on the poppet 122 in the distal direction.

The combined fluid force of fluid from the second port 112 communicated to the chamber 145 and communicated to the chamber 126 amounts to a second fluid force $F_2$ on the poppet 122 acting on a second surface area of the poppet 122 that is also equal to the circular area $A_S$ of the poppet seat 124 in the distal direction (opposite the force F). As such, fluid at the second port 112 acts on the same area $A_S$ of the poppet 122 as the area on which fluid at the first port 110 acts. Assuming that pressure level at the second port 112 is $P_2$, then the second fluid force $F_2$ acting on the poppet 122 in the distal direction is $$F_2 = P_2 . A_s = P_2 . \pi \frac{D_S^2}{4}.$$

The valve 100 further includes a position sensor configured to provide sensor information indicative of a linear or axial position of the poppet 122 and axial position of the pilot piston 132. Various types of position sensors can be used to indicate position of the poppet 122 and the pilot piston 132. Example linear position sensors include linear potentiometers, linear magnetic Hall Effect sensors, magnetostrictive linear position sensor, incremental linear encoders, linear inductive position sensors, linear variable differential transformer (LVDT) sensors, draw-wire sensors, Eddy current sensors, capacitive position sensors, single point laser sensors, finger optic linear position sensors, rotary encoders, etc.

In the example implementation of FIG. 1, the position sensor may include the poppet activator pin 138, the piston activator pin 146, and a magnetic sensor 152 mounted or coupled to the housing 102. In an example, the magnetic sensor 152 can be adjusted within the housing 102 for calibration. For instance, a lock nut 153 secures the magnetic sensor 152 in a particular position for calibration. After calibration, sealing wax 154 is applied to document the calibration at the factory before providing the valve 100 to end users.

In an example, the magnetic sensor 152 can be configured to measure magnetic field intensity. As the poppet 122 moves, the poppet activator pin 138 moves therewith, and the magnetic field intensity sensed or measured by the magnetic sensor 152 changes. The position of the poppet 122 to which the poppet activator pin 138 is attached can be correlated with the magnetic field intensity measured by the magnetic sensor 152. Particularly, a controller can receive the magnetic field intensity information from the magnetic sensor 152, and can then determine the position of the poppet 122 based on the magnetic field intensity information.

Similarly, as the pilot piston 132 moves, the piston activator pin 146 moves therewith, and the magnetic field intensity sensed or measured by the magnetic sensor 152 changes. The position of the pilot piston 132 to which the piston activator pin 146 is attached can be correlated with the magnetic field intensity measured by the magnetic sensor 152. Particularly, a controller can receive the magnetic field intensity information from the magnetic sensor 152, and can then determine the position of the pilot piston 132 based on the magnetic field intensity information.

In an example, the position sensor is an inductive position sensor. In this example, the magnetic sensor 152 has one or more coils that receive electric power from a controller through a connector 156, and responsively develops a magnetic field, which can induce a respective magnetic field in the poppet activator pin 138 and the piston activator pin 146. As the poppet activator pin 138 and the piston activator pin 146 (i.e., the magnetic targets) move, the magnetic field changes, and such change is sensed by the coils of the magnetic sensor 152. The coils of the magnetic sensor 152 generate one or more voltage signal indicative of the change, which are correlated with a position of the poppet activator pin 138 (and the poppet 122) and the piston activator pin 146 (and the pilot piston 132). The one or more voltage signals are provided to the controller through the connector 156.

In an example, the magnetic sensor 152 can have a first set of coils disposed proximal to the poppet activator pin 138 and a second set of coils disposed proximal to the piston activator pin 146. The first set of coils can detect changes in magnetic field intensity associated with movement of the poppet activator pin 138, whereas the second set of coils can detect changes in magnetic field intensity associated with movement of the piston activator pin 146. In another example, however, one coil or one set of coils can be configured to measure the magnetic field intensity and changes thereof as both the poppet activator pin 138 and the piston activator pin 146 move.

In one example, the position sensor is an on/off switch type sensor configured to determine whether the poppet 122 is seated at the poppet seat 124 (or whether the flanged portion 125 of the poppet 122 overlaps with the interior portion 131 of the main sleeve 104). In such position, the valve 100 blocks fluid flow from the first port 110 to the second port 112. In this example, the poppet activator pin 138 can be made uniformly of a Ferro-magnetic metallic material In another example, the position sensor is a proportional sensor capable of determining axial position of the poppet 122 along a continuum of positions from a closed position (shown in FIG. 1) and a fully open position (see FIG. 2). In this example, the poppet activator pin 138 can be configured as a bi-metallic component having a permanent magnet portion at its proximal end interacting with the magnetic sensor 152.

Similarly, in one example, the position sensor is an on/off switch type sensor configured to determine whether the pilot piston 132 is in an unmoved or unactuated position shown in FIG. 1. In another example, the position sensor is a proportional sensor capable of determining axial position of the pilot piston 132 along a continuum of positions from an unactuated position (shown in FIG. 1) and an actuated position (see FIG. 3). In this example, the piston activator pin 146 can be configured as a bi-metallic component having a permanent magnet portion at its proximal end interacting with the magnetic sensor 152.

Regardless of whether the position sensor is an on/off type switch type sensor or a proportional sensor, the position sensor can provide information indicative of the relative positions of the poppet 122 and the pilot piston 132. Such information enables the controller to determine the mode of operation of the valve 100.

The valve 100 is configured to operate in two modes of operation. Particularly, the valve 100 can operate: (i) in a first mode of operation allowing free fluid flow from the second port 112 to the first port 110 when the pressure difference $(P_2-P_1)$ is sufficient to overcome the check spring 129, and (ii) a second mode of operation allowing fluid received at the first port 110 to flow to the second port 112 when a pilot fluid pressure signal having a particular or threshold pressure level is received at the third port 116.

Figure 2:
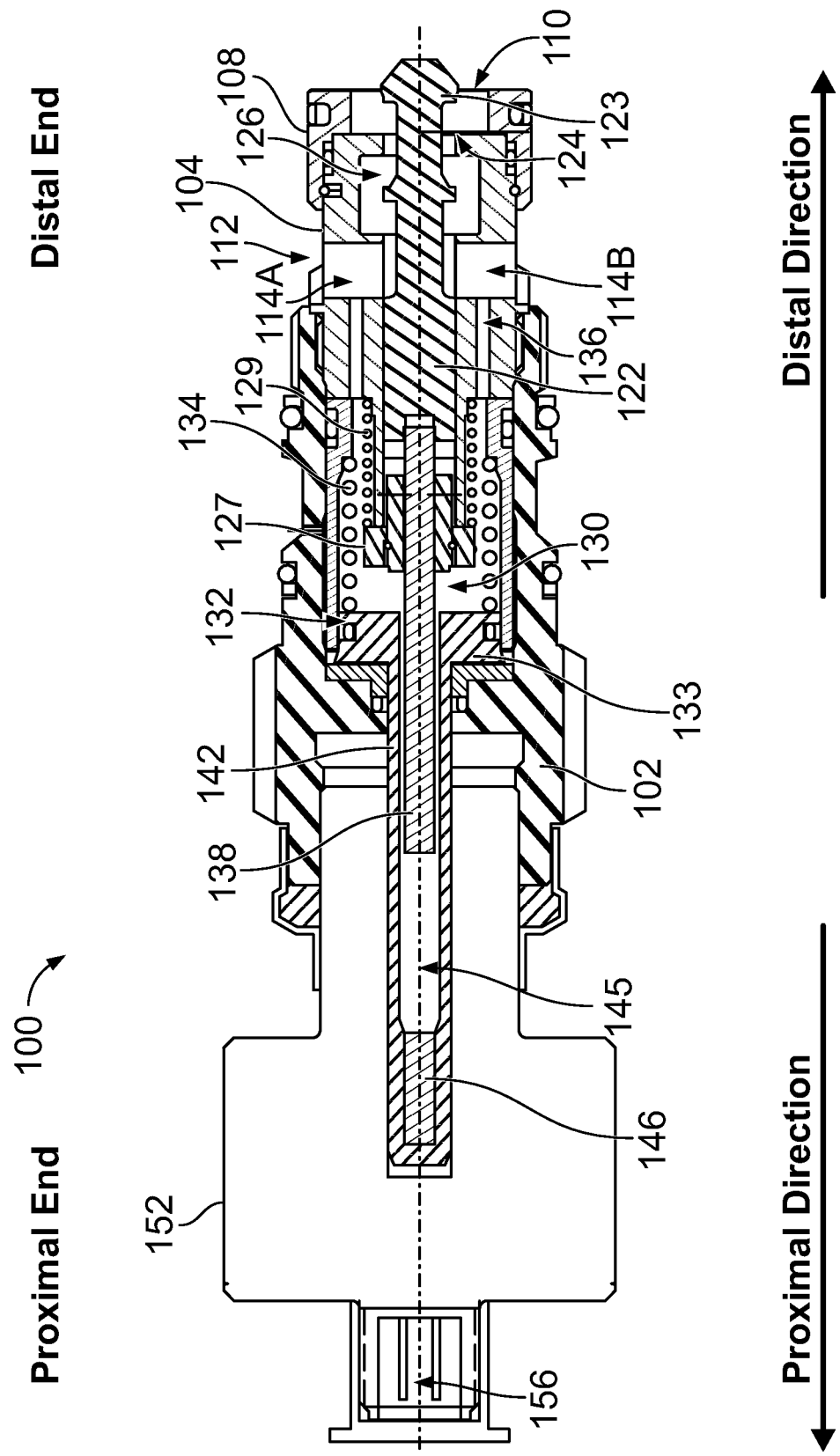
FIG. 2 illustrates a cross-sectional side view of the valve of FIG. 1 operating in a first mode allowing free fluid flow from a second port to a first port, in accordance with an example implementation.

FIG. 2 illustrates a cross-sectional side view of the valve 100 operating in a first mode of operation allowing free fluid flow from the second port 112 to the first port 110, in accordance with an example implementation. The term "free" indicates that fluid flow can occur at a substantially low pressure difference (e.g., 5 psi) between the second port 112 and the first port 110.

As mentioned above, fluid at the first port 110 applies the first fluid force F on the poppet 122 in the proximal direction. Also, the check spring 129 applies a biasing force $F_{Spr}$ on the poppet 122 in the proximal direction. Further, fluid at the second port 112 applies the second fluid force $F_2$ on the poppet 122 in the distal direction. As such, the first fluid force $F_1$ and the spring force $F_{Spr}$ of the check spring 129 act on the poppet 122 in the proximal direction (i.e., the closing direction), whereas the second fluid force $F_2$ acts on the poppet in the distal direction (i.e., the opening direction). When the second fluid force $F_2$ overcomes the first fluid force $F_1$ and the spring force $F_{Spr}$ (i.e., when $F_2 > F_1 + F_{Spr}$), the poppet 122 is unseated as it moves off the poppet seat 124 in the distal direction as shown in FIG. 2, thereby compressing the check spring 129.

As shown in FIG. 2, the poppet 122 has moved in the distal direction away from the pilot piston 132, which remains in position under the biasing forces of the pilot spring 134. As the poppet 122 is unseated, fluid flows from the second port 112 through the cross-holes 114A, 114B, through the chamber 126 to the first port 110.

Advantageously, as mentioned above, fluid at the second port 112 acts on the same area $A_S$ $$\left(\pi \frac{D_S^2}{4}\right)$$

of the poppet 122 as the area on which fluid at the first port 110 acts. Thus, when the pressure differential ($P_2 - P_1$) between the second port 112 and the first port 110 is sufficient to overcome the check spring 129, the poppet 122 can be unseated. For example, if the check spring 129 is a 5 psi spring, and the pressure level at the first port is 2000 psi, then a pressure level of about 2005 psi at the second port 112 may be sufficient to unseat the poppet 122 and allow fluid flow to the first port 110. Even if the pressure level at the first port 110 is high, e.g., 4000 psi, a pressure level of about 4005 psi at the second port 112 can open the valve 100.

Further, as the poppet 122 moves, the poppet activator pin 138 moves therewith. The magnetic sensor 152 can then provide a signal indicating a position of the poppet activator pin 138 and the poppet 122 as described above. At the same time, the pilot piston 132 and the piston activator pin 146 do not move, and the magnetic sensor 152 provides a signal indicating the unactuated (unmoved) position of the pilot piston 132. Based on information indicating that the poppet 122 has moved while the pilot piston 132 has not moved, the controller receiving the signals determines that the valve 100 is operating in the first mode of operation.

When pressure level at the second port 112 decreases such that the check spring 129 and fluid pressure at the first port 110 return the poppet 122 to the seated position of FIG. 1, the magnetic sensor 152 can provide a signal indicating that the valve 100 is closed and that the load acting on the hydraulic actuator is held in-position safely.

In the example implementation where the position sensor is a proportional position sensor capable of determining a stroke or axial position of the poppet 122 along a continuum of positions, the controller can estimate the fluid flow rate from the second port 112 to the first port 110. Particularly, as described above, the pressure differential ($P_2 - P_1$) remains substantially constant (e.g., 5 psi) regardless of the pressure levels at the second port 112 and the first port 110. The controller can thus estimate the flow rate using Bernoulli's orifice equation: $Q = K \sqrt{(P_2 - P_1)}$, where Q is the fluid flow rate from the second port 112 to the first port 110, and K is a variable that is proportional to or is based on the stroke or axial position of the poppet 122. The controller can include information that correlates the sensor information received from the position sensor (e.g., the magnetic sensor 152) to the variable K, and can thus estimate the fluid flow rate Q.

In addition to the first mode of operation, the valve 100 can operate in a second mode of operation allowing fluid flow from the first port 110 to the second port 112 when a pilot fluid signal having a threshold pressure value is received at the third port 116.

Figure 3:
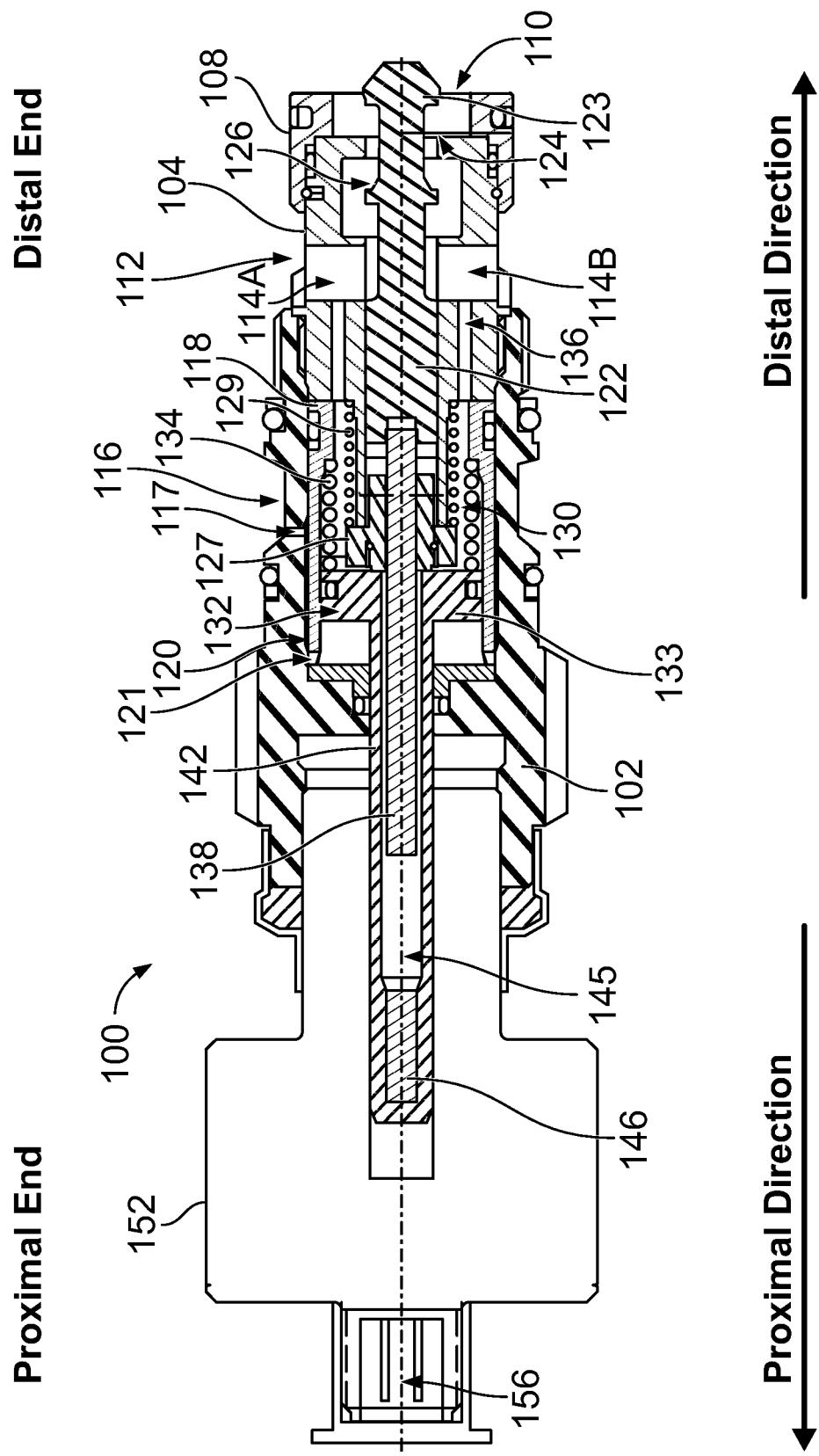
FIG. 3 illustrates a cross-sectional side view of the valve of FIG. 1 operating in a second mode allowing fluid flow from the first port to the second port upon receiving a pilot fluid signal at a pilot port, in accordance with an example implementation.

FIG. 3 illustrates a cross-sectional side view of the valve 100 operating is a second mode of operation allowing fluid flow from the first port 110 to the second port 112 upon receiving a pilot fluid signal at the third port 116, in accordance with an example implementation. The pilot fluid signal received at the third port 116 is communicated through the pilot signal cross-hole 117, the annular groove 120, and the space 121 to apply a pilot fluid force in the distal direction on the flanged portion 133 of the pilot piston 132. As shown in FIGS. 3, the pilot fluid signal can move the pilot piston 132 in the distal direction until it contacts the poppet 122. Once the pilot piston 132 contacts the poppet 122, the forces applied on the poppet 122 in the proximal direction are transmitted to the pilot piston 132, and forces applied to the pilot piston 132 in the distal direction are transmitted to the poppet 122.

As mentioned above, fluid received at the first port 110 applies a fluid force $F_1$ in the proximal direction (e.g., to the left in FIG. 3) on the poppet 122 toward the poppet seat 124. Particularly, fluid acts on an area of the poppet 122 that is equal to the circular area $A_S$ as described above.

Further, the check spring 129 also applies a biasing force on the poppet 122 in the proximal direction toward the poppet seat 124. As such, the poppet 122 can remain seated at the poppet seat 124 until a force acting on the poppet 122 in the distal direction overcomes the combined forces of the check spring 129 and the pressurized fluid at the first port 110 acting on the poppet 122 in the proximal direction.

The pilot fluid signal received at the third port 116 applies the pilot fluid force in the distal direction on the flanged portion 133 of the pilot piston 132. The flanged portion 133 of the pilot piston 132 has an annular surface area on which the pilot fluid signal acts. The annular surface area can be determined as:

$$A_{Pilot\ Piston} = \pi \frac{(D_1^2 - D_2^2)}{4},$$

where $D_1$ is the inner diameter of the pilot sleeve 118 and $D_2$ is the outer diameter of the non-magnetic tube portion 142 of the pilot piston 132. Thus, the pilot fluid force acting on the pilot piston 132 in the distal direction is $$F_{Pilot\ Piston} = P_3 \cdot \pi \frac{(D_1^2 - D_2^2)}{4},$$

where $P_3$ is the pressure level of the pilot fluid signal received at the third port 116.

Also, fluid at the second port 112 is communicated through the longitudinal channel 136 to the spring chamber 130 and applies a force on the pilot piston 132 in the proximal direction. Thus, a net pilot fluid force $F_{NP}$ equal to the difference between the force of the pilot fluid signal and the force of the fluid of the second port 112 acts on the pilot piston 132. Further, the pilot spring 134 applies a force $F_{P\_Spr}$ on the pilot piston 132 in the proximal direction.

Further, as described above, fluid at the second port 112 applies a fluid force $F_2$ on the poppet 122 in the distal direction. When the net pilot fluid force $F_{NP}$ acting on the pilot piston 132 in the distal direction and the fluid force $F_2$ acting on the poppet 122 in the distal direction overcome the fluid force $F_1$ of fluid at the first port 110 and the spring forces $F_{Spr}$ and $F_{P\_Spr}$, the pilot piston 132 and the poppet 122 move in the distal direction as shown in FIG. 3 compared to FIG. 1. In other words, if the pilot fluid signal has a threshold pressure level $P_3$ that causes $(F_{NP}+F_2)$ to be greater than $(F_1+F_{Spr}+F_{P\_Spr})$, the pilot piston 132 and the poppet 122 can move in the distal direction as shown in FIG. 3.

In this second mode of operation, the second port 112 may be fluidly-coupled via a directional control valve to a fluid reservoir having fluid at a low pressure level. As such, for the sake of simplicity, $P_2$ may be assumed to be ~ 0 psi. In this case, the pilot piston 132 and the poppet 122 can move when $(P_3 \cdot A_{Pilot\ Piston})$ is greater than $(P_1 \cdot A_S + F_{Spr} + F_{P\_Spr})$.

In an example, the valve 100 is characterized by a pilot ratio $$P_R = \frac{A_{Pilot\ Piston}}{A_S}$$

that may determine the pressure level $P_3$ of the pilot fluid signal that is sufficient to unseat the poppet 122. As an example, a 3:1 pilot ratio (i.e., the area $A_{Pilot\ Piston}$ is three times the area $A_S$) indicates that the threshold pressure level $P_3$ of the pilot fluid signal that is sufficient to unseat the poppet 122 is larger than 33% of the pressure level $P_1$ of fluid at the first port 110. For instance, if the pressure level at the first port 110 is 3000 psi, then the threshold pressure level $P_3$ is greater than 1000 psi (e.g., 1100 psi to overcome both the fluid force $P_1$. As and the spring forces $F_{Spr}+F_{P\_Spr}$ and frictional forces).

The poppet 122 can move axially in the distal direction until force equilibrium between the fluid forces and the spring forces acting on the pilot piston 132 and the poppet 122 is achieved. FIG. 3 illustrates the valve 100 with the poppet 122 unseated off the poppet seat 124, thereby allowing fluid flow from the first port 110 through the chamber 126 to the cross-holes 114A, 114B of the second port 112. In the example where the second port 112 is fluidly-coupled to a fluid reservoir having low pressure fluid (e.g., 0-70 psi), pressure level $P_1$ at the first port 110 "collapses" or is substantially reduced when the poppet 122 is unseated.

As the poppet 122 moves, the poppet activator pin 138 moves therewith. The magnetic sensor 152 can then provide a signal indicating a position of the poppet activator pin 138 and the poppet 122 as described above. At the same time, as the pilot piston 132 and the piston activator pin 146 move, the magnetic sensor 152 provides a signal indicating the actuated (moved) position of the pilot piston 132. Based on information indicating that both the poppet 122 and the pilot piston 132 have moved, the controller receiving the signals determines that the valve 100 is operating in the second mode of operation.

When the pilot fluid signal is removed from the third port 116, the pilot spring 134 pushes the pilot piston 132 back in the proximal direction, ejecting the pilot fluid signal back through the pilot signal cross-hole 117 and the third port 116. The check spring 129 then returns the poppet 122 to the seated position shown in FIG. 1.

As the poppet 122 and the pilot piston 132 move in the proximal direction, the poppet activator pin 138 and the piston activator pin 146 move therewith. The magnetic sensor 152 can then provide one or more signals indicating positions of the poppet 122 and the pilot piston 132 as described above. When the poppet 122 returns to the seated position of FIG. 1, the magnetic sensor 152 can provide a signal indicating that the valve 100 is closed and that the load acting on the hydraulic actuator is held in-position safely.

Thus, the valve 100 can be used to allow fluid flow from the first port 110 to the second port 112 when a pilot fluid signal having a threshold pressure level is provided to the third port 116. Further, as described above with respect to FIG. 2, the valve 100 can be used to allow free fluid flow from the second port 112 to the first port 110. With such functionality, the valve 100 can be used in various hydraulic systems.

Figure 4:
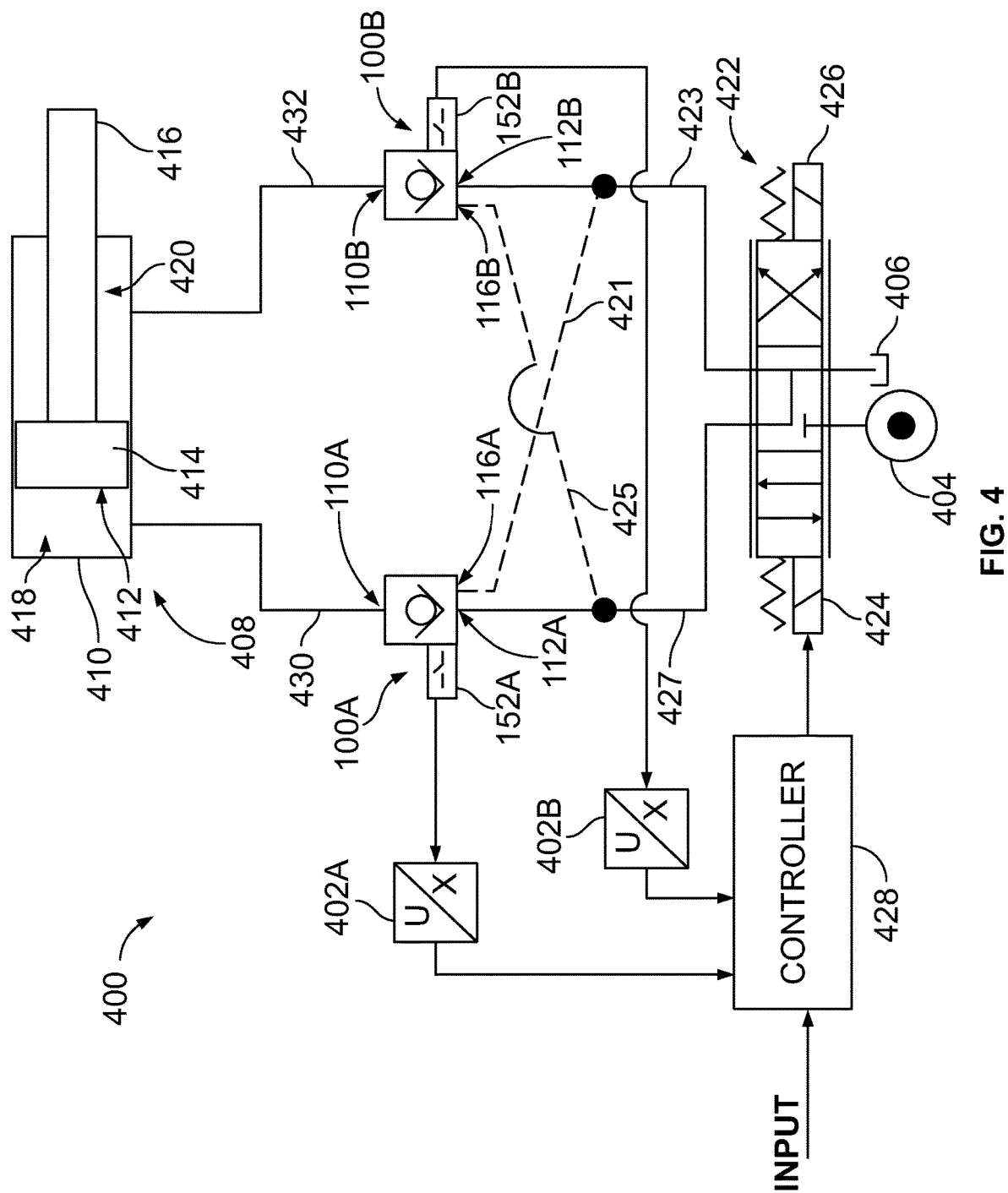
FIG. 4 illustrates a hydraulic system, in accordance with an example implementation.

FIG. 4 illustrates a hydraulic system 400, in accordance with an example implementation. The hydraulic system 400 includes two valves 100A, 100B depicted symbolically in FIG. 4. Each of the valves 100A, 100B represents the valve 100 described above with respect to FIGS. 1-3 and has the same components of the valve 100. Therefore, the components or elements of valves 100A, 100B are designated with the same reference numbers used for the valve 100 in FIGS. 1-3 with an "A" or "B" suffix. The position sensors (e.g., the combination of the magnetic sensor 152, the poppet activator pin 138, and the piston activator pin 146) are represented symbolically as position sensor 402A for the valve 100A and as position sensor 402B for the valve 100B.

The hydraulic system 400 includes a source 404 of fluid such as a pump, an accumulator, or another portion of the hydraulic system. The hydraulic system 400 also includes a tank or fluid reservoir 406 containing fluid at a low pressure (e.g., 0-70 psi).

In the hydraulic system 400, the valves 100A, 100B are pilot-operated check valves configured to control fluid flow to and from an actuator 408. The actuator 408 includes a cylinder 410 and an actuator piston 412 slidably-accommodated in the cylinder 410. The actuator piston 412 includes a piston head 414 and a piston rod 416 extending from the piston head 414 along a central longitudinal axis direction of the cylinder 410. The piston head 414 divides the inner space of the cylinder 410 into a first chamber 418 and a second chamber 420. The first port 110A of the valve 100A is fluidly-coupled to the first chamber 418 via fluid line 430, and the first port 110B of the valve 100B is fluidly-coupled to the second chamber 420 via fluid line 432.

A hydraulic cylinder actuator is used herein as an example. Other types of actuators, such as a hydraulic motor, can be used.

The hydraulic system 400 includes a directional control valve 422. In an example, the directional control valve 422 can include four ports: (i) an inlet port that is fluidly-coupled to the source 404, (ii) a return port that is fluidly-coupled to the fluid reservoir 406, (iii) a first workport that is fluidly-coupled to the second port 112A of the valve 100A via fluid line 427, and (iii) a second workport that is fluidly-coupled to the second port 112B of the valve 100B via fluid line 423.

As depicted in FIG. 4, the third port 116A of the valve 100A is fluidly-coupled via pilot line 421 to the fluid line 423. Similarly, the third port 116B of the valve 100B is fluidly-coupled via pilot line 425 to the fluid line 427.

In an example, the directional control valve 422 can be as spool type valve having a spool that is axially-movable within a bore in a valve body of the directional control valve 422. In this example, the spool can be biased to a neutral position by two springs on opposite sides of the spool as depicted symbolically in FIG. 4. In the example implementation of FIG. 4, in such neutral position, the two valve workports can be fluidly-coupled to the fluid reservoir 406. In other examples, the spool may block all ports at the neutral position.

Further, although the directional control valve 422 is shown as a single valve, in other example implementation, the directional control valve 422 can comprise two separate valves, each valve independently controlling fluid flow to the second ports 112A, 112B of the valves 100A, 100B, respectively. As such, any valve assembly or valve configuration performing the operations of the directional control valve 422 is contemplated herein.

In an example, the directional control valve 422 is electrically-actuated. For instance, the directional control valve 422 can have a first solenoid 424 and a second solenoid 426 that, when energized, move the spool within the directional control valve 422. The directional control valve 422 can be a proportional flow control valve. In other words, the fluid flow rate through the directional control valve is proportional to the magnitude of the electric command signal provided to the first solenoid 424 or the second solenoid 426.

The hydraulic system 400 further includes a controller 428. The controller 428 can include one or more processors or microprocessors and may include data storage (e.g., memory, transitory computer-readable medium, non-transitory computer-readable medium, etc.). The data storage may have stored thereon instructions that, when executed by the one or more processors of the controller 428, cause the controller 428 to perform operations described herein.

The controller 428 can receive input or input information comprising input commands (e.g., from a joystick of a machine) indicating a speed and direction for the actuator piston 412, for example. The controller 428 also receives sensor information via signals from the position sensors 402A, 402B. In response, the controller 428 provides electrical actuation signals to various components of the hydraulic system 400 such as the solenoids 424, 426.

For example, the controller 428 can receive a command or input information requesting extending the actuator piston 412 at a particular speed. The controller 428 then provides a signal to the first solenoid 424 of the directional control valve 422, thereby allowing fluid flow from the source 404 of fluid through the directional control valve 422, through the fluid line 427 to the second port 112A of the valve 100A. A pilot fluid signal is provided from the fluid line 427 via the pilot line 425 to the third port 116B of the valve 100n.

The valve 100A operates in the first mode of operation described above in FIG. 2. Particularly, the valve 100A allows fluid flow from the second port 112A to the first port 110A when the pressure differential between the second port 112A and the first port 110A overcomes the check spring 129. Fluid then flows through the fluid line 430 to the first chamber 418 of the actuator 408, thereby extending the actuator piston 412 (e.g., moving the actuator piston 412 to the right in FIG. 4).

As the actuator piston 412 extends, fluid discharged from the second chamber 420 flows through the fluid line 432 to the first port 110B of the valve 100B. The valve 100B operates in the second mode of operation described above with respect to FIG. 3. Particularly, as the pressure level of the pilot fluid signal provided to the third port 116B reaches the threshold pressure level sufficient to move the pilot piston 132 and the poppet 122 of the valve 100B, the poppet 122 is unseated and fluid is allowed to flow from the first port 110B to the second port 112B. Fluid then flows through the fluid line 423, then through the directional control valve 422 to the fluid reservoir 406.

During the extension operation, the controller 428 receives from the position sensors 402A, 402B information indicative of the positions of the pilot piston 132 and the poppet 122 of the valves 100A, 100B, respectively. The controller 428 can thus confirm that each valve operates in the appropriate mode of operation.

Further, based on the position of the poppet 122 of the valve 100A, the controller 428 can estimate the fluid flow rate through the valve 100A and compare it to a target or commanded fluid flow rate that achieves a particular commanded speed for the actuator piston 412. The controller 428 can then adjust the command signal (i.e., adjust the magnitude of the electric current or voltage) sent to the first solenoid 424 of the directional control valve 422 to achieve the target fluid flow rate. As such, the controller 428 can implement closed-loop feedback control to achieve the target flow rate based on feedback signal from the position sensor 402A.

When the actuator piston 412 reaches a desired position, the controller 428 removes the command signal from the first solenoid 424 to close the directional control valve 422. Responsively, the valve 100A and the valve 100B also close (operate in the state shown in FIG. 1). The position sensor 402B provides an indication that the poppet 122 returned to a seated position or to a position at which fluid flow is blocked between the first port 110B and the second port 112B. This way, the controller 428 receives an indication that the actuator piston 412 will not move and that any load handled by the actuator piston 412 is held in-position.

Similarly, the controller 428 can receive a command or input information requesting retraction of the actuator piston 412 (e.g., moving the actuator piston 412 to the left in FIG. 4) at a particular speed. The controller 428 then provides a signal to the second solenoid 426 of the directional control valve 422, thereby allowing fluid flow from the source 404 of fluid through the directional control valve 422, and through the fluid line 423 to the second port 112B of the valve 100B. A pilot fluid signal is provided from the fluid line 423 via the pilot line 421 to the third port 116A of the valve 100A.

The valve 100B operates in the first mode of operation described above in FIG. 2. Particularly, the valve 100B allows fluid flow from the second port 112B to the first port 110B when the pressure differential between the second port 112B and the first port 110B overcomes the check spring 129. Fluid then flows through the fluid line 432 to the second chamber 420 of the actuator 408, thereby retracting the actuator piston 412 (e.g., moving the actuator piston 412 to the left in FIG. 4).

As the actuator piston 412 retracts, fluid discharged from the first chamber 418 flows through the fluid line 430 to the first port 110A of the valve 100A. The valve 100A operates in the second mode of operation described above with respect to FIG. 3. Particularly, as the pressure level of the pilot fluid signal provided to the third port 116A reaches the threshold pressure level sufficient to move the pilot piston 132 and the poppet 122 of the valve 100A, the poppet 122 is unseated and fluid is allowed to flow from the first port 110A to the second port 112A. Fluid then flows through the fluid line 427, then through the directional control valve 422 to the fluid reservoir 406.

During the retraction operation, the controller 428 receives from the position sensors 402A, 402B information indicative of the positions of the pilot piston 132 and the poppet 122 of the valves 100A, 100B. The controller 428 can thus confirm that each valve operates in the appropriate mode of operation.

Further, based on the position of the poppet 122 of the valve 100B, the controller 428 can estimate the fluid flow rate through the valve 100B and compare it to a target or commanded fluid flow rate that achieves a particular commanded speed for the actuator piston 412. The controller 428 can then adjust, based on the estimated fluid flow rate, the command signal (i.e., adjust the magnitude of the electric current or voltage) sent to the second solenoid 426 of the directional control valve 422 to achieve the target fluid flow rate. As such, the controller 428 can implement closed-loop feedback control to achieve the target flow rate based on feedback signal from the position sensor 402B.

When the actuator piston 412 reaches a desired position, the controller 428 removes the command signal from the second solenoid 426 to close the directional control valve 422. Responsively, the valve 100A and the valve 100B also close (operate in the state shown in FIG. 1). The position sensor 402A provides an indication that the poppet 122 returned to a seated position or to a position at which fluid flow is blocked between the first port 110A and the second port 112A. This way, the controller 428 receives an indication that the actuator piston 412 will not move and that any load handled by the actuator piston 412 is held in-position.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

Embodiments of the present disclosure can thus relate to one of the enumerated example embodiments (EEEs) listed below.

EEE 1 is a valve comprising: a plurality of ports comprising: a first port, a second port, and a third port configured to receive a pilot fluid signal; a poppet configured to be subjected to (i) a first fluid force by fluid of the first port acting on a first surface area of the poppet in a proximal direction toward a poppet seat, wherein the poppet blocks fluid flow to and from the first port when seated at the poppet seat, and (ii) a second fluid force by fluid of the second port acting on a second surface area of the poppet, equal to the first surface area, in a distal direction; a pilot piston configured to be subjected to a pilot fluid force by the pilot fluid signal acting in the distal direction; a check spring applying a spring force on the poppet in the proximal direction; and a pilot spring applying a pilot spring force on the pilot piston in the proximal direction, wherein the valve is configured to operate in: (i) a first mode of operation, wherein a pressure differential between the second port and the first port overcomes the spring force of the check spring, causing the poppet to be unseated and allow fluid flow from the second port to the first port, and (ii) a second mode of operation, wherein the pilot fluid force overcomes the pilot spring force, causing the pilot piston to move in the distal direction, thereby causing the poppet to move therewith off the poppet seat, allowing fluid flow from the first port to the second port.

EEE 2 is the valve of EEE 1, further comprising: a position sensor configured to provide sensor information indicating a position of the poppet and a respective position of the pilot piston.

EEE 3 is the valve of EEE 2, wherein the position sensor comprises: a poppet activator pin configured as a magnetic target coupled to the poppet; a piston activator pin configured as a respective magnetic target coupled to the pilot piston; and a magnetic sensor configured to detect position of the poppet activator pin and the piston activator pin.

EEE 4 is the valve of any of EEEs 1-3, further comprising: a housing having a longitudinal cylindrical cavity; and a main sleeve disposed, at least partially, within the longitudinal cylindrical cavity of the housing, wherein the main sleeve comprises the poppet seat, and wherein the poppet is slidably-accommodated within the main sleeve.

EEE 5 is the valve of EEE 4, further comprising: a nose piece coupled to the main sleeve, wherein the nose piece comprises the first port, wherein the main sleeve comprises the second port, and wherein the housing comprises the third port.

EEE 6 is the valve of any of EEEs 4-5, further comprising: a spring chamber in which the check spring and the pilot spring are disposed, wherein the main sleeve comprises a longitudinal channel that fluidly couples the second port to the spring chamber.

EEE 7 is the valve of any of EEEs 4-6, wherein the poppet comprises a flanged portion that overlaps with an interior portion of the main sleeve when the poppet is seated at the poppet seat, wherein the valve further comprises: a position sensor configured to indicate whether the flanged portion of the poppet overlaps with the interior portion of the main sleeve.

EEE 8 is a hydraulic system comprising: a source of fluid; a fluid reservoir; an actuator having a first chamber and a second chamber therein; a directional control valve having (i) an inlet port fluidly-coupled to the source of fluid, (ii) a return port fluidly coupled to the fluid reservoir, and (iii) a workport, wherein the directional control valve is configured to fluidly-couple the inlet port to the workport or fluidly couple the workport to the return port; and a valve comprising: a plurality of ports comprising: (i) a first port fluidly-coupled to the first chamber of the actuator, (ii) a second port fluidly-coupled to the workport of the directional control valve, and (iii) a third port configured to receive a pilot fluid signal from fluid provided to the second chamber of the actuator, a poppet configured to be subjected to (i) a first fluid force by fluid of the first port acting on a first surface area of the poppet in a proximal direction toward a poppet seat, wherein the poppet blocks fluid flow to and from the first port when seated at the poppet seat, and (ii) a second fluid force by fluid of the second port acting on a second surface area of the poppet, equal to the first surface area, in a distal direction, a pilot piston configured to be subjected to a pilot fluid force by the pilot fluid signal acting in the distal direction, a check spring applying a spring force on the poppet in the proximal direction, and a pilot spring applying a pilot spring force on the pilot piston in the proximal direction, wherein the valve is configured to operate in: (i) a first mode of operation, wherein a pressure differential between the second port and the first port overcomes the spring force of the check spring, causing the poppet to be unseated and allow fluid flow from the second port to the first port, thereby allowing fluid flow from the workport of the directional control valve to the first chamber of the actuator, and (ii) a second mode of operation, wherein the pilot fluid force overcomes the pilot spring force, causing the pilot piston to move in the distal direction, thereby causing the poppet to move therewith off the poppet seat, allowing fluid flow from the first port to the second port, thereby allowing fluid flow from the first chamber of the actuator to the workport of the directional control valve.

EEE 9 is the hydraulic system of EEE 8, wherein the valve further comprises: a position sensor configured to provide sensor information indicating a position of the poppet and a respective position of the pilot piston.

EEE 10 is the hydraulic system of EEE 9, further comprising: a controller performing operations comprising: receiving the sensor information from the position sensor; when the valve operates in the first mode of operation, estimating fluid flow rate through the valve from the second port to the first port; and actuating the directional control valve based on estimated fluid flow rate.

EEE 11 is the hydraulic system of EEE 10, wherein the operations further comprise: receiving the sensor information from the position sensor; and determining, based on the sensor information, whether the poppet is in a seated position.

EEE 12 is the hydraulic system of any of EEEs 9-11, wherein the position sensor comprises: a poppet activator pin configured as a magnetic target coupled to the poppet; a piston activator pin configured as a respective magnetic target coupled to the pilot piston; and a magnetic sensor configured to detect position of the poppet activator pin and the piston activator pin.

EEE 13 is the hydraulic system of any of EEEs 8-12, wherein the valve further comprises: a housing having a longitudinal cylindrical cavity; and a main sleeve disposed, at least partially, within the longitudinal cylindrical cavity of the housing, wherein the main sleeve comprises the poppet seat, and wherein the poppet is slidably-accommodated within the main sleeve.

EEE 14 is the hydraulic system of EEE 13, further comprising: a nose piece coupled to the main sleeve, wherein the nose piece comprises the first port, wherein the main sleeve comprises the second port, and wherein the housing comprises the third port.

EEE 15 is the hydraulic system of any of EEEs 13-14, wherein the valve further comprises: a spring chamber in which the check spring and the pilot spring are disposed, wherein the main sleeve comprises a longitudinal channel that fluidly couples the second port to the spring chamber.

EEE 16 is the hydraulic system of any of EEEs 13-15, wherein the poppet comprises a flanged portion that overlaps with an interior portion of the main sleeve when the poppet is seated at the poppet seat, wherein the valve further comprises a position sensor configured to provide sensor information indicating a position of the poppet, and wherein the hydraulic system further comprises: a controller performing operations comprising: receiving the sensor information from the position sensor; and determining, based on the sensor information, whether the flanged portion of the poppet overlaps with the interior portion of the main sleeve.

EEE 17 is a valve comprising: a plurality of ports comprising: a first port, a second port, and a third port configured to receive a pilot fluid signal; a poppet configured to be subjected to (i) a first fluid force by fluid of the first port acting on the poppet in a proximal direction toward a poppet seat, wherein the poppet blocks fluid flow to and from the first port when seated at the poppet seat, and (ii) a second fluid force by fluid of the second port acting on the poppet in a distal direction; a pilot piston configured to be subjected to a pilot fluid force by the pilot fluid signal acting in the distal direction; a check spring applying a spring force on the poppet in the proximal direction; a pilot spring applying a pilot spring force on the pilot piston in the proximal direction, wherein the valve is configured to operate in: (i) a first mode of operation, wherein a pressure differential between the second port and the first port overcomes the spring force of the check spring, causing the poppet to be unseated and allow fluid flow from the second port to the first port, and (ii) a second mode of operation, wherein the pilot fluid force overcomes the pilot spring force, causing the pilot piston to move in the distal direction, thereby causing the poppet to move therewith off the poppet seat, allowing fluid flow from the first port to the second port; and a position sensor comprising: (i) a poppet activator pin configured as a magnetic target coupled to the poppet, (ii) a piston activator pin configured as a respective magnetic target coupled to the pilot piston, and (iii) a magnetic sensor configured to detect position of the poppet activator pin and the piston activator pin.

EEE 18 is the valve of EEE 17, wherein the poppet has a channel, wherein the pilot piston comprises a flanged portion and a non-magnetic tube portion, wherein the piston activator pin is coupled to the non-magnetic tube portion of the pilot piston, and wherein the poppet activator pin is disposed through the channel of the poppet and is disposed partially within the non-magnetic tube portion of the pilot piston.

EEE 19 is the valve of EEE 18, wherein fluid of the second port flows to the non-magnetic tube portion of the pilot piston and applies a force on the poppet via the poppet activator pin.

EEE 20 is the valve of any of EEEs 17-19, further comprising: a housing having a longitudinal cylindrical cavity; a main sleeve disposed, at least partially, within the longitudinal cylindrical cavity of the housing, wherein the main sleeve comprises the poppet seat, and wherein the poppet is slidably-accommodated within the main sleeve; and a nose piece coupled to the main sleeve, wherein the nose piece comprises the first port, wherein the main sleeve comprises the second port, and wherein the housing comprises the third port.

What is claimed is:

1. A valve comprising:
   a housing having a longitudinal cylindrical cavity;
   a main sleeve disposed, at least partially, within the longitudinal cylindrical cavity of the housing, wherein the main sleeve comprises a poppet seat;
   a plurality of ports comprising: a first port, a second port, and a third port configured to receive a pilot fluid signal;
   a poppet slidably-accommodated within the main sleeve and configured to be subjected to (i) a first fluid force by fluid of the first port acting on the poppet in a proximal direction toward a poppet seat, wherein the poppet blocks fluid flow to and from the first port when seated at the poppet seat, and (ii) a second fluid force by fluid of the second port acting on the poppet in a distal direction;
   a pilot piston configured to be subjected to a pilot fluid force by the pilot fluid signal acting in the distal direction;
   a check spring applying a spring force on the poppet in the proximal direction; and
   a pilot spring applying a pilot spring force on the pilot piston in the proximal direction, wherein the valve is configured to operate in: (i) a first mode of operation, wherein a pressure differential between the second port and the first port overcomes the spring force of the check spring, causing the poppet to be unseated and allow fluid flow from the second port to the first port, and (ii) a second mode of operation, wherein the pilot fluid force overcomes the pilot spring force, causing the pilot piston to move in the distal direction, thereby causing the poppet to move therewith off the poppet seat, allowing fluid flow from the first port to the second port.

2. The valve of claim 1, further comprising:
   a position sensor configured to provide sensor information indicating a position of the poppet and a respective position of the pilot piston.

3. The valve of claim 2, wherein the position sensor comprises:
   a poppet activator pin configured as a magnetic target coupled to the poppet;
   a piston activator pin configured as a respective magnetic target coupled to the pilot piston; and
   a magnetic sensor configured to detect position of the poppet activator pin and the piston activator pin.

4. The valve of claim 1, further comprising:
   a nose piece coupled to the main sleeve, wherein the nose piece comprises the first port, wherein the main sleeve comprises the second port, and wherein the housing comprises the third port, wherein the main sleeve is fixedly-coupled to the housing, and wherein the nose piece is floating relative to the main sleeve.

5. The valve of claim 1, further comprising:
   a spring chamber in which the check spring and the pilot spring are disposed, wherein the main sleeve comprises a longitudinal channel that fluidly couples the second port to the spring chamber.

6. The valve of claim 1, wherein the poppet comprises a flanged portion that overlaps with an interior portion of the main sleeve when the poppet is seated at the poppet seat, wherein the valve further comprises:
   a position sensor configured to indicate whether the flanged portion of the poppet overlaps with the interior portion of the main sleeve.

7. A hydraulic system comprising:
   a source of fluid;
   a fluid reservoir;
   an actuator having a first chamber and a second chamber therein;
   a directional control valve having (i) an inlet port fluidly-coupled to the source of fluid, (ii) a return port fluidly coupled to the fluid reservoir, and (iii) a workport, wherein the directional control valve is configured to fluidly-couple the inlet port to the workport or fluidly couple the workport to the return port;
   a valve comprising:
      a plurality of ports comprising: (i) a first port fluidly-coupled to the first chamber of the actuator, (ii) a second port fluidly-coupled to the workport of the directional control valve, and (iii) a third port configured to receive a pilot fluid signal from fluid provided to the second chamber of the actuator,
      a poppet configured to be subjected to (i) a first fluid force by fluid of the first port acting on the poppet in a proximal direction toward a poppet seat, wherein the poppet blocks fluid flow to and from the first port when seated at the poppet seat, and (ii) a second fluid force by fluid of the second port acting on the poppet in a distal direction,
      a pilot piston configured to be subjected to a pilot fluid force by the pilot fluid signal acting in the distal direction,
      a check spring applying a spring force on the poppet in the proximal direction, and
      a pilot spring applying a pilot spring force on the pilot piston in the proximal direction, wherein the valve is configured to operate in: (i) a first mode of operation, wherein a pressure differential between the second port and the first port overcomes the spring force of the check spring, causing the poppet to be unseated and allow fluid flow from the second port to the first port, thereby allowing fluid flow from the workport of the directional control valve to the first chamber of the actuator, and (ii) a second mode of operation, wherein the pilot fluid force overcomes the pilot spring force, causing the pilot piston to move in the distal direction, thereby causing the poppet to move therewith off the poppet seat, allowing fluid flow from the first port to the second port, thereby allowing fluid flow from the first chamber of the actuator to the workport of the directional control valve;
   a position sensor configured to provide sensor information indicating a position of the poppet and a respective position of the pilot piston; and a controller performing operations comprising:
receiving the sensor information from the position sensor,
when the valve operates in the first mode of operation, estimating fluid flow rate through the valve from the second port to the first port, and
actuating the directional control valve based on estimated fluid flow rate.

8. The hydraulic system of claim 7, wherein the operations further comprise:
receiving the sensor information from the position sensor; and
determining, based on the sensor information, whether the poppet is in a seated position.

9. The hydraulic system of claim 7, wherein the position sensor comprises:
a poppet activator pin configured as a magnetic target coupled to the poppet;
a piston activator pin configured as a respective magnetic target coupled to the pilot piston; and
a magnetic sensor configured to detect position of the poppet activator pin and the piston activator pin.

10. The hydraulic system of claim 7, wherein the valve further comprises:
a housing having a longitudinal cylindrical cavity; and
a main sleeve disposed, at least partially, within the longitudinal cylindrical cavity of the housing, wherein the main sleeve comprises the poppet seat, and wherein the poppet is slidably-accommodated within the main sleeve.

11. The hydraulic system of claim 10, further comprising:
a nose piece coupled to the main sleeve, wherein the nose piece comprises the first port, wherein the main sleeve comprises the second port, and wherein the housing comprises the third port.

12. The hydraulic system of claim 10, wherein the valve further comprises:
a spring chamber in which the check spring and the pilot spring are disposed, wherein the main sleeve comprises a longitudinal channel that fluidly couples the second port to the spring chamber.

13. The hydraulic system of claim 10, wherein the poppet comprises a flanged portion that overlaps with an interior portion of the main sleeve when the poppet is seated at the poppet seat, wherein the valve further comprises a position sensor configured to provide sensor information indicating a position of the poppet, and wherein the hydraulic system further comprises:
a controller performing operations comprising:
receiving the sensor information from the position sensor; and
determining, based on the sensor information, whether the flanged portion of the poppet overlaps with the interior portion of the main sleeve.

14. A valve comprising:
a plurality of ports comprising: a first port, a second port, and a third port configured to receive a pilot fluid signal;
a poppet configured to be subjected to (i) a first fluid force by fluid of the first port acting on the poppet in a proximal direction toward a poppet seat, wherein the poppet blocks fluid flow to and from the first port when seated at the poppet seat, and (ii) a second fluid force by fluid of the second port acting on the poppet in a distal direction;
a pilot piston configured to be subjected to a pilot fluid force by the pilot fluid signal acting in the distal direction;
a check spring applying a spring force on the poppet in the proximal direction;
a pilot spring applying a pilot spring force on the pilot piston in the proximal direction, wherein the valve is configured to operate in: (i) a first mode of operation, wherein a pressure differential between the second port and the first port overcomes the spring force of the check spring, causing the poppet to be unseated and allow fluid flow from the second port to the first port, and (ii) a second mode of operation, wherein the pilot fluid force overcomes the pilot spring force, causing the pilot piston to move in the distal direction, thereby causing the poppet to move therewith off the poppet seat, allowing fluid flow from the first port to the second port; and
a position sensor comprising: (i) a poppet activator pin configured as a magnetic target coupled to the poppet, (ii) a piston activator pin configured as a respective magnetic target coupled to the pilot piston, and (iii) a magnetic sensor configured to detect position of the poppet activator pin and the piston activator pin.

15. The valve of claim 14, wherein the poppet has a channel, wherein the pilot piston comprises a flanged portion and a non-magnetic tube portion, wherein the piston activator pin is coupled to the non-magnetic tube portion of the pilot piston, and wherein the poppet activator pin is disposed through the channel of the poppet and is disposed partially within the non-magnetic tube portion of the pilot piston.

16. The valve of claim 15, wherein fluid of the second port flows to the non-magnetic tube portion of the pilot piston and applies a force on the poppet via the poppet activator pin.

17. The valve of claim 14, further comprising:
a housing having a longitudinal cylindrical cavity;
a main sleeve disposed, at least partially, within the longitudinal cylindrical cavity of the housing, wherein the main sleeve comprises the poppet seat, and wherein the poppet is slidably-accommodated within the main sleeve; and
a nose piece coupled to the main sleeve, wherein the nose piece comprises the first port, wherein the main sleeve comprises the second port, and wherein the housing comprises the third port.

* * * * *